US010312069B2

(12) United States Patent
Jarrell

(10) Patent No.: US 10,312,069 B2
(45) Date of Patent: Jun. 4, 2019

(54) DUAL MODE IONIZATION DEVICE

(71) Applicant: Waters Technologies Corporation, Milford, MA (US)

(72) Inventor: Joseph A. Jarrell, Newton Highlands, MA (US)

(73) Assignee: Waters Technologies Corporation, Milford, MA (US)

(*) Notice: Subject to any disclaimer, the term of this patent is extended or adjusted under 35 U.S.C. 154(b) by 0 days.

(21) Appl. No.: 15/491,298

(22) Filed: Apr. 19, 2017

(65) Prior Publication Data

US 2017/0309465 A1 Oct. 26, 2017

Related U.S. Application Data

(60) Provisional application No. 62/325,662, filed on Apr. 21, 2016.

(51) Int. Cl.
*H01J 49/16* (2006.01)
*H01J 49/34* (2006.01)
*G01N 27/62* (2006.01)
*H01J 49/10* (2006.01)

(52) U.S. Cl.
CPC .......... *H01J 49/165* (2013.01); *G01N 27/622* (2013.01); *H01J 49/107* (2013.01); *H01J 49/16* (2013.01); *H01J 49/34* (2013.01)

(58) Field of Classification Search
None
See application file for complete search history.

(56) References Cited

U.S. PATENT DOCUMENTS

| | | | | |
|---|---|---|---|---|
| 5,668,370 A * | 9/1997 | Yano | H01J 49/107 250/285 |
| 7,034,291 B1 * | 4/2006 | Fischer | H01J 49/06 250/288 |
| 8,809,777 B2 | 8/2014 | Bajic | |
| 2006/0145089 A1 * | 7/2006 | Cristoni | H01J 49/0468 250/423 F |
| 2006/0255261 A1 * | 11/2006 | Whitehouse | H01J 49/0431 250/288 |
| 2009/0294660 A1 * | 12/2009 | Whitehouse | H01J 49/045 250/288 |
| 2012/0104248 A1 * | 5/2012 | Hardman | H01J 49/165 250/288 |
| 2014/0151547 A1 * | 6/2014 | Bajic | H01J 49/0445 250/282 |
| 2014/0353489 A1 * | 12/2014 | Szalay | H01J 49/16 250/282 |
| 2015/0144781 A1 * | 5/2015 | Howes | H01J 49/045 250/282 |
| 2016/0196965 A1 * | 7/2016 | Satake | H01J 49/0468 250/288 |
| 2016/0307744 A1 | 10/2016 | Jarrell | |

OTHER PUBLICATIONS

Major, H. et al., "*A Novel Source Design for the Analysis of Both Polar and Non-Polar Species*", ASMS Abstract (2012).

* cited by examiner

*Primary Examiner* — Michael J Logie
(74) *Attorney, Agent, or Firm* — Womble Bond Dickinson (US) LLP; Deborah M. Vernon; Heath T. Misley

(57) ABSTRACT

An ion source is disclosed that alternates between ionizing analytes in a sample by electrospray ionization and impact ionization.

11 Claims, 2 Drawing Sheets

DUAL MODE IONIZATION DEVICE

CROSS-REFERENCE TO RELATED APPLICATION

This application claims priority from and the benefit of U.S. provisional patent application Ser. No. 62/325,662 filed on 21 Apr. 2016. The entire contents of that application are incorporated herein by reference.

FIELD OF THE INVENTION

The present invention relates to an ion source for a mass and/or ion mobility spectrometer. In particular, the present invention relates to an ion source that can be operated two modes of ionization.

BACKGROUND

Atmospheric Pressure Ionization ("API") ion sources are commonly used to ionize the liquid flow from HPLC or UPLC chromatography devices prior to analyzing the resulting gas phase ions via a mass spectrometer. Two techniques which are most commonly used comprise Electrospray Ionization ("ESI") and Atmospheric Pressure Chemical Ionization ("APCI"). In ESI techniques, a nebulizer, in the presence of an electric field, converts a liquid sample stream into a spray of charged droplets. As these droplets evaporate, they generate analyte ions.

It is also known to ionize analyte by an Impact spray technique. According to this technique, a nebulizer converts a liquid sample stream into a spray of droplets. These droplets are then directed to impact onto a surface maintained at an elevated electrical potential, thus creating a plurality of ions from the droplets. Typically, this surface may be a stainless steel cylindrical pin. WO 2012/143737 discloses an example of such an Impact spray technique. While the exact mechanisms of ionization in Impact spray techniques are not yet fully understood, it is believed that an essential feature is that droplets impact and bounce off the charged surface. In doing so, these droplets become charged. Subsequently, ions are generated as these droplets evaporate.

It is desired to provide an improved ion source, mass and/or ion mobility spectrometer, method of ionizing a sample, and method of mass and/or ion mobility spectrometry.

SUMMARY

From a first aspect the present invention provides an ion source for ionizing analyte in a sample comprising:

a sprayer for spraying a liquid sample into a spray region;

a voltage supply for supplying an electrical potential difference in the spray region, in a first ionization mode, so as to produce analyte ions by electrospray ionization;

an impact surface onto which the sprayer sprays the sample, in a second ionization mode, so as to ionize the analyte by impact ionization; and a switching mechanism configured to alternate the ion source between the first and second ionization modes during a single experimental run.

The embodiments of the present invention enable ionization of analyte molecules by two different modes of ionization. Some compounds are more efficiently ionized by electrospray while others are more effectively ionized by impact spray. As the ion source alternates between the two modes of ionization, a given analyte may be subjected to both modes of ionization during a single experimental run, thereby producing an optimised analyte ion signal. The ion source is therefore able to generate optimal ion signals for a sample without requiring replicate samples, which are not always available, and without requiring separate experimental runs for the different modes of ionization.

Also, the use of electrospray and impact spray ionisation techniques enables a relatively wide range of compounds to be ionised efficiently without requiring a high degree of desolvation of the sample.

The ion source and method described herein may be arranged so that the droplets of sample generated by the sprayer are evaporated during the first and/or second ionization process so as to produce gas phase ions. For example, in the second ionization mode the droplets impact on the impact surface (e.g. the first electrode), rebound therefrom and may be evaporated thereafter to produce gas phase ions. In the second ionization mode the impact surface may be electrically charged such that the droplets pick up electrical charges when they impact the surface.

The switching mechanism may be arranged and configured to repeatedly alternate the ion source between the first and second ionization modes such that each of the first and second ionization modes is performed multiple times during a single experimental run. Each of the first and second modes may be performed at least x times during the single experimental run, wherein x is selected from the group consisting of: 2; 3; 4; 5; 6; 7; 8; 9; 10; 15; 20; 25; 30; 35; 40; 45; 50; 60; 70; 80; 90; 100; 150; 200; 250; 300; 350; 400; 450; 500; 750; 1000; 1500; 2000; 2500; 3000; 4000; and 5000.

The sprayer described herein may be a nebulizer such as a pneumatically assisted nebulizer. A nebulizing gas flow may be arranged to flow passed the tip of the nebulizer through which the sample exits so as to nebulize the sample to form droplets of the sample. Accordingly, the sprayer may comprise an inner bore through which the liquid sample is sprayed, in use, and a nebulizer capillary surrounding the inner bore through which a nebulising gas is passed in use. The outlets of the inner bore and nebulizer capillary may be arranged such that the nebulising gas exits the nebulizer capillary and passes the outlet of inner bore so as to nebulize the sample leaving the inner bore.

The outlet of the inner bore may protrude beyond the outlet of the nebulizer capillary.

The nebulizer capillary may be at least partially surrounded by a desolvation heater. The desolvation heater heats a flow of gas, optionally a separate flow of desolvation gas. The desolvation heater is arranged and adapted such that the flow of heated gas emerging from the desolvation heater, envelopes and heats the nebulized sample after it exits the inner bore of the nebulizer. For example, the nebulizer capillary may be surrounded by an annular desolvation heater.

The heater may be arranged and adapted to heat the gas to a temperature of ≥100° C. or up to 650° C. Heating the gas in this manner assists in the desolvation of the sample droplets when the gas comes into contact with the nebulized sample.

The heater may be an electrical heater, e.g., operated by passing an electric current through an electrically resistive element.

The heater may be spaced upstream from the outlet of the nebulizer capillary and/or the outlet of the inner bore. The heater may be spaced upstream from the outlet of the nebulizer capillary and/or the outlet of the inner bore by a distance selected from the group consisting of: ≤50 mm; ≤45 mm; ≤40 mm; ≤35 mm; ≤30 mm; ≤25 mm; ≤20 mm; ≤15 mm; ≤10 mm; ≤5 mm; ≤4 mm; ≤3 mm; ≤2 mm; and ≤1 mm.

The ion source may be arranged and configured to maintain the inner bore at ground electrical potential during said first and/or second ionization modes. In embodiments wherein the above described electrical heater is provided, electrically grounding the inner bore enables the electrical heater to be arranged closer to the exposed portion of the bore, e.g., closer to the exposed tip of the bore.

The sprayer comprises a bore through which the liquid sample is sprayed, in use, and the voltage supply may be arranged and configured to maintain this bore at ground electrical potential, or a first reference electrical potential, during said first and/or second ionization modes.

The ion source may comprise a first electrode downstream of the sprayer and the voltage source may be configured to supply a potential difference between the outlet of the sprayer and the first electrode, in the first ionization mode, so as to produce the ions by electrospray ionization. For example, the voltage supply may be arranged and configured to maintain the first electrode at a different electrical potential to the ground or reference potential during said first ionization mode.

Alternatively, or additionally, the voltage supply may be configured to maintain said impact surface at a different electrical potential to the ground or reference potential during said second ionization mode.

The voltage supply may be arranged and configured to maintain the first electrode at a voltage of a first polarity relative to the ground or reference potential during said first ionization mode. The voltage supply may be arranged and configured to maintain the impact surface at a voltage of a second, opposite polarity relative to the ground or reference potential during said second ionization mode. The first polarity may be negative during the first ionization mode and the second polarity may be positive during the second ionization mode. This may be used to produce positive analyte ions by electrospray and impact spray during the first and second modes. If negative analyte ions are desired to be produced in the first and second modes then the first polarity may be positive during the first ionization mode and the second polarity may be negative during the second ionization mode. It will be appreciated that the analysis and detection of negative analyte ions may require the polarities of voltages applied to electrical elements downstream of the location where the analyte ions are generated to be reversed, as compared to during the analysis and detection of positive analyte ions.

The ion source may be arranged and configured to repeatedly alternate between positive analyte ion mode generation and negative analyte ion mode generation during the single experimental run, for example, such that positive analyte ions and negative analyte ions are generated by electrospray ionisation during the single experimental run and/or such that positive analyte ions and negative analyte ions are generated by impact ionisation during the single experimental run.

The voltage supply may be arranged and configured to maintain said potential difference between the sprayer and a first downstream electrode in the first ionization mode such that analyte in the sample sprayed from the sprayer is ionized by electrospray ionization; and said ion source may be arranged and configured to spray said sample from said sprayer onto the first electrode in said second ionization mode so that the sample is ionized by impact ionization.

The sprayer comprises a bore through which the liquid sample is sprayed, in use, and the voltage supply may be arranged and configured to maintain the bore at ground electrical potential, or a first reference electrical potential, during said first and second ionization modes; and to maintain the first electrode at a voltage of a first polarity relative to the ground or reference potential during said first ionization mode.

The voltage supply may be arranged and configured to maintain the first electrode at a voltage of a second polarity, opposite to the first polarity, relative to the ground or reference potential during said second ionization mode.

The first polarity may be negative relative to the ground or reference potential during the first ionization mode, and the second polarity may be positive relative to the ground or reference potential during the second ionization mode. This may be used to produce positive analyte ions by electrospray and impact spray during the first and second modes. If negative analyte ions are desired to be produced in the first and second modes then the first polarity may be positive during the first ionization mode and the second polarity may be negative during the second ionization mode. It will be appreciated that the analysis and detection of negative analyte ions may require the polarities of voltages applied to electrical elements downstream of the location where the analyte ions are generated to be reversed, as compared to during the analysis and detection of positive analyte ions.

The ion source may be arranged and configured to repeatedly alternate between positive analyte ion mode generation and negative analyte ion mode generation during the single experimental run, for example, such that positive analyte ions and negative analyte ions are generated by electrospray ionisation during the single experimental run and/or such that positive analyte ions and negative analyte ions are generated by impact ionisation during the single experimental run.

The embodiments of the invention therefore enable the ion source to be switched between the first and second modes of ionization by altering the electrical potential on the first electrode. This avoids the requirement for two different ionization chambers for the two modes of ionization and the mechanical complexity associated therewith, such as the need to electrically shield one ionization chamber from the other.

The ion source may comprise a sample separator upstream of the sprayer and in fluid communication with the sprayer for separating components within the sample such that the sprayer receives and sprays different components of the sample at different times. The sample separator may be a liquid chromatography separator.

The switching mechanism may be arranged and configured to alternate the ion source between the first and second ionization modes at a rate such that at least one of the components in the sample, or each component in the sample, is ionized in both the first and second ionization modes as it elutes from the separator and sprayer. For example, the switching mechanism may alternate the ion source between the first and second ionization modes at a rate selected from the group consisting of: ≥0.5 Hz; ≥1 Hz; ≥2 Hz; ≥5 Hz; ≥10 Hz; ≥20 Hz; ≥40 Hz; ≥60 Hz; ≥80 Hz; ≥100 Hz; ≥150 Hz; ≥200 Hz; ≥300 Hz; ≥400 Hz; ≥500 Hz; ≥600 Hz; ≥700 Hz; ≥800 Hz; ≥900 Hz; ≥1 kHz; ≥2 kHz; ≥3 kHz; ≥4 kHz; and ≥5 kHz. Additionally, or alternatively, the method may comprise alternating between the first and second ionization modes at a rate selected from the group consisting of: ≤5 Hz; ≤10 Hz; ≤20 Hz; ≤40 Hz; ≤60 Hz; ≤80 Hz; ≤100 Hz; ≤150 Hz; ≤200 Hz; ≤300 Hz; ≤400 Hz; ≤500 Hz; ≤600 Hz; ≤700 Hz; ≤800 Hz; ≤900 Hz; ≤1 kHz; ≤2 kHz; ≤3 kHz; ≤4 kHz; and ≤5 kHz. Accordingly, in embodiments where the first electrode causes the electrospray ionization and impact ionization, the voltage applied to said first electrode in the first and second ionization modes may be alternated between the values for each mode at a rate selected from the groups described above.

The ion source may comprise a translator mechanism arranged and configured to translate the sprayer between a first spraying angle or location in the first mode of operation and a second, different spraying angle or location in the second mode of operation. This allows, for example, for the sprayer to be located in the optimum position for electrospray ionisation in the first mode and for the sprayer to be located in the optimum position for impact ionisation in the second mode.

For example, the translator mechanism may oscillate the sprayer back and forth along an arc between the first and second locations as the ion source alternates between the first and second modes of operation.

The ion source may comprise a spray guide arranged and configured to direct the spray from the sprayer to pass along a first pathway in the first ionization mode, and to direct the spray from the sprayer to pass along a second, different pathway in the second ionization mode. Optionally, the spray guide deflects the spray so as to pass along the first pathway in the first ionization mode and/or deflects the spray so as to pass along the second pathway in the second ionization mode.

The first and second pathways may be paths having different lengths.

Alternatively, or additionally, the first and second pathways may be paths having different directions.

The first pathway may be the pathway from the sprayer tip to the first electrode. The second pathway may be the pathway from the sprayer tip to the impact surface or first electrode.

The first aspect also provides a mass and/or ion mobility spectrometer comprising:

an ion source as described herein; and a mass and/or ion mobility analyzer for mass and/or ion mobility analyzing ions produced by the first and second ionization modes.

The spectrometer may comprise a vacuum region and the impact surface and/or first electrode arranged as an interface between the spray region and vacuum region. The spectrometer may be arranged and configured to maintain, in use, the spray region at a first pressure and the vacuum region at a second pressure lower than the first pressure; optionally wherein said first pressure is substantially atmospheric pressure.

The impact surface and/or first electrode may comprise an aperture and the spectrometer may be arranged and configured, in use, to urge ions generated in the first and/or second ionization modes through the aperture into the vacuum region. For example, the impact surface and/or first electrode may be an interface cone interfacing the sprayer with the entrance to the vacuum region of the spectrometer.

The pressure difference between the sprayer region and the vacuum region may generate a gas flow between the two regions that urges the ions generated in the first and/or second ionization modes through the aperture into the vacuum region.

The mass and/or ion mobility analyzer may be arranged in the vacuum region.

The first aspect also provides a method of ionizing a sample comprising;

performing a first ionization mode in which the sample is electrosprayed so as to produce ions by electrospray ionization;

performing a second ionization mode in which the sample is ionized by impact ionization; and alternating between the first and second ionization modes during a single experimental run.

The step of alternating between the first and second ionization modes may comprise repeatedly alternating between the first and second ionization modes such that each of the first and second ionization modes is performed multiple times during a single experimental run. Each of the first and second modes may be performed at least x times during the single experimental run, wherein x is selected from the group consisting of: 2; 3; 4; 5; 6; 7; 8; 9; 10; 15; 20; 25; 30; 35; 40; 45; 50; 60; 70; 80; 90; 100; 150; 200; 250; 300; 350; 400; 450; 500; 750; 1000; 1500; 2000; 2500; 3000; 4000; and 5000.

The first ionization mode may comprise spraying said sample using a sprayer and maintaining an electrical potential difference between the sprayer and a first electrode such that the sample sprayed from the sprayer is ionized by electrospray ionization; and/or the second ionization mode may comprise spraying said sample onto an impact surface so that the sample is ionized by impact ionization.

The sprayer described herein may be a nebulizer such as a pneumatically assisted nebulizer. A gas flow may be arranged to flow passed the tip of the nebulizer through which the sample exits so as to nebulize the sample to form droplets of the sample.

The method may comprise spraying the sample through a bore in the sprayer and maintaining the bore at ground electrical potential, or a first reference electrical potential, during said first and/or second ionization modes.

The method may comprise maintaining the first electrode at a different electrical potential to the ground or reference potential during said first ionization mode. Alternatively, or additionally, the method may comprise maintaining said impact surface at a different electrical potential to the ground or reference potential during said second ionization mode.

The method may comprise maintaining the first electrode at a voltage of a first polarity relative to the ground or reference potential during said first ionization mode. Alternatively, or additionally, the method may comprise maintaining the impact surface at a voltage of a second, opposite polarity relative to the ground or reference potential during said second ionization mode. The first polarity may be negative during the first ionization mode and the second polarity may be positive during the second ionization mode. This may be used to produce positive analyte ions by electrospray and impact spray during the first and second modes. If negative analyte ions are desired to be produced in the first and second modes then the first polarity may be positive during the first ionization mode and the second polarity may be negative during the second ionization mode. It will be appreciated that the analysis and detection of negative analyte ions may require the polarities of voltages applied to electrical elements downstream of the location where the analyte ions are generated to be reversed, as compared to during the analysis and detection of positive analyte ions.

The ion source may be arranged and configured to repeatedly alternate between positive analyte ion mode generation and negative analyte ion mode generation during the single experimental run, for example, such that positive analyte ions and negative analyte ions are generated by electrospray ionisation during the single experimental run and/or such that positive analyte ions and negative analyte ions are generated by impact ionisation during the single experimental run.

The first ionization mode may comprise spraying said sample using a sprayer and maintaining an electrical potential difference between the sprayer and a first downstream electrode such that the sample sprayed from the sprayer is ionized by electrospray ionization; and the second ionization mode may comprise spraying said sample using said sprayer onto the first electrode so that the sample is ionized by impact ionization.

The method may comprise spraying the sample through a bore in the sprayer and maintaining the bore at ground electrical potential, or a first reference electrical potential, during said first and second ionization modes; and maintaining the first electrode at a voltage of a first polarity relative to the ground or reference potential during said first ionization mode.

The method may also comprise maintaining the first electrode at a voltage of a second, opposite polarity relative to the ground or reference potential during said second ionization mode.

The first polarity may be negative during the first ionization mode and the second polarity may be positive during the second ionization mode. This may be used to produce positive analyte ions by electrospray and impact spray during the first and second modes. If negative analyte ions are desired to be produced in the first and second modes then the first polarity may be positive during the first ionization mode and the second polarity may be negative during the second ionization mode. It will be appreciated that the analysis and detection of negative analyte ions may require the polarities of voltages applied to electrical elements downstream of the location where the analyte ions are generated to be reversed, as compared to during the analysis and detection of positive analyte ions.

The ion source may be arranged and configured to repeatedly alternate between positive analyte ion mode generation and negative analyte ion mode generation during the single experimental run, for example, such that positive analyte ions and negative analyte ions are generated by electrospray ionisation during the single experimental run and/or such that positive analyte ions and negative analyte ions are generated by impact ionisation during the single experimental run.

The method may comprise spatially separating different components within the sample upstream of the sprayer, and supplying the separated components to the sprayer such that the sprayer sprays different components of the sample at different times. Optionally, the components are separated by a liquid chromatography separator.

The method may be alternated between the first and second ionization modes at a rate such that at least one of the components in the sample, or each component in the sample, is ionized in both the first and second ionization modes as it elutes from the separator and sprayer.

The method may comprise alternating between the first and second ionization modes at a rate selected from the group consisting of: ≥0.5 Hz; ≥1 Hz; ≥2 Hz; ≥5 Hz; ≥10 Hz; ≥20 Hz; ≥40 Hz; ≥60 Hz; ≥80 Hz; ≥100 Hz; ≥150 Hz; ≥200 Hz; ≥300 Hz; ≥400 Hz; ≥500 Hz; ≥600 Hz; ≥700 Hz; ≥800 Hz; ≥900 Hz; ≥1 kHz; ≥2 kHz; ≥3 kHz; ≥4 kHz; and ≥5 kHz. Additionally, or alternatively, the method may comprise alternating between the first and second ionization modes at a rate selected from the group consisting of: ≤5 Hz; ≤10 Hz; ≤20 Hz; ≤40 Hz; ≤60 Hz; ≤80 Hz; ≤100 Hz; ≤150 Hz; ≤200 Hz; ≤300 Hz; ≤400 Hz; ≤500 Hz; ≤600 Hz; ≤700 Hz; ≤800 Hz; ≤900 Hz; ≤1 kHz; ≤2 kHz; ≤3 kHz; ≤4 kHz; and ≤5 kHz. Accordingly, in embodiments where the first electrode causes the electrospray ionization and impact ionization, the voltage applied to said first electrode in the first and second ionization modes may be alternated between the values for each mode at a rate selected from the groups described above.

The method may comprise alternating the sprayer between a first spraying angle or location in the first mode of operation and a second, different spraying angle or location in the second mode of operation. For example, the sprayer may oscillate back and forth along an arc between the first and second locations as the method alternates between the first and second modes of operation.

The method may comprise arranging the spray from the sprayer to pass along a first pathway in the first ionization mode, and the spray from the sprayer to pass along a second, different pathway in the second ionization mode. Optionally, this may be achieved by deflecting the spray so as to pass along the first pathway in the first ionization mode and/or deflecting the spray so as to pass along the second pathway in the second ionization mode.

The first and second pathways may be paths having different lengths.

Alternatively, or additionally, the first and second pathways may be paths having different directions.

The first pathway may be the pathway from the sprayer tip to the first electrode. The second pathway may be the pathway from the sprayer tip to the impact surface or first electrode.

The first aspect also provides a method of mass and/or ion mobility spectrometry comprising:

ionizing a sample according to the method described herein; and mass and/or ion mobility analyzing ions produced in the first and second ionization modes in a mass and/or ion mobility spectrometer.

A sprayer may spray the sample into a spray region in the first and second ionization modes and the spectrometer comprises a vacuum region, wherein the spray region may be maintained at a first pressure and the vacuum region at a second pressure lower than the first pressure. The impact surface and/or first electrode may be arranged as an interface between the spray region and vacuum region. Optionally, the first pressure is substantially atmospheric pressure.

The impact surface and/or first electrode may comprise an aperture and the ions generated in the first and/or second ionization modes may be urged through the aperture into the vacuum region. For example, the impact surface and/or first electrode may be an interface cone interfacing the sprayer with the entrance to the vacuum region of the spectrometer.

The pressure difference between the sprayer region and the vacuum region may generate a gas flow between the two regions that urges the ions generated in the first and/or second ionization modes through the aperture into the vacuum region.

The mass and/or ion mobility spectrometer may comprise a mass and/or ion mobility analyzer arranged in the vacuum region which performs said step of mass and/or ion mobility analyzing ions.

The translator mechanism and spray guide described herein are believed to be novel in their own right, i.e. without the first and second ionization modes necessarily being performed in a single experimental run.

Accordingly, from a second aspect the present invention provides an ion source for ionizing analyte in a sample comprising:

a sprayer for spraying a liquid sample into a spray region;

a voltage supply for supplying an electrical potential difference in the spray region, in a first ionization mode, so as to produce analyte ions by electrospray ionization;

an impact surface onto which the sprayer sprays the sample, in a second ionization mode, so as to ionize the analyte by impact ionization; and further comprising one or more of:

(i) a translator mechanism arranged and configured to translate the sprayer between a first spraying angle or location in the first mode of operation and a second, different spraying angle or location in the second mode of operation; and/or (ii) a spray guide arranged and configured to direct the spray from the sprayer to pass along a first pathway in the first ionization mode, and to direct the spray from the sprayer to pass along a second, different pathway in the second ionization mode.

For example, according to step (i), the translator mechanism may oscillate the sprayer back and forth along an arc between the first and second locations as the ion source alternates between the first and second modes of operation.

By way of example, according to step (ii), the spray guide may deflect the spray so as to pass along the first pathway in the first ionization mode and/or may deflect the spray so as to pass along the second pathway in the second ionization mode.

The ion source according to the second aspect may comprise any of the features described in relation to the first aspect of the invention, except that the first and second ionization modes need not necessarily be performed in a single experimental run.

The second aspect also provides a mass and/or ion mobility spectrometer comprising the ion source, a method of ionizing a sample using the ion source, and a method of mass and/or ion mobility spectrometry using the ion source.

The spectrometer described herein may comprise one or more ion guides.

The spectrometer may comprise one or more ion mobility separation devices and/or one or more Field Asymmetric Ion Mobility Spectrometer devices.

The spectrometer may comprise one or more ion traps or one or more ion trapping regions.

The spectrometer may comprise one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device.

The spectrometer may comprise a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser.

The spectrometer may comprise one or more energy analysers or electrostatic energy analysers.

The spectrometer may comprise one or more ion detectors.

The spectrometer may comprise one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter.

The spectrometer may comprise a device or ion gate for pulsing ions; and/or a device for converting a substantially continuous ion beam into a pulsed ion beam.

The spectrometer may comprise a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser.

The spectrometer may comprise a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

The spectrometer may comprise a device arranged and adapted to supply an AC or RF voltage to the electrodes. The AC or RF voltage optionally has an amplitude selected from the group consisting of: (i) about <50 V peak to peak; (ii)

about 50-100 V peak to peak; (iii) about 100-150 V peak to peak; (iv) about 150-200 V peak to peak; (v) about 200-250 V peak to peak; (vi) about 250-300 V peak to peak; (vii) about 300-350 V peak to peak; (viii) about 350-400 V peak to peak; (ix) about 400-450 V peak to peak; (x) about 450-500 V peak to peak; and (xi) > about 500 V peak to peak.

The AC or RF voltage may have a frequency selected from the group consisting of: (i) < about 100 kHz; (ii) about 100-200 kHz; (iii) about 200-300 kHz; (iv) about 300-400 kHz; (v) about 400-500 kHz; (vi) about 0.5-1.0 MHz; (vii) about 1.0-1.5 MHz; (viii) about 1.5-2.0 MHz; (ix) about 2.0-2.5 MHz; (x) about 2.5-3.0 MHz; (xi) about 3.0-3.5 MHz; (xii) about 3.5-4.0 MHz; (xiii) about 4.0-4.5 MHz; (xiv) about 4.5-5.0 MHz; (xv) about 5.0-5.5 MHz; (xvi) about 5.5-6.0 MHz; (xvii) about 6.0-6.5 MHz; (xviii) about 6.5-7.0 MHz; (xix) about 7.0-7.5 MHz; (xx) about 7.5-8.0 MHz; (xxi) about 8.0-8.5 MHz; (xxii) about 8.5-9.0 MHz; (xxiii) about 9.0-9.5 MHz; (xxiv) about 9.5-10.0 MHz; and (xxv) > about 10.0 MHz.

The spectrometer may comprise a chromatography or other separation device upstream of the sprayer or nebulizer. The chromatography separation device may comprise a liquid chromatography. Alternatively, the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The analyte may comprise peptides, polypeptides, proteins or biomolecules.

The spectrometer may be operated in various modes of operation including a mass spectrometry ("MS") mode of operation; a tandem mass spectrometry ("MS/MS") mode of operation; a mode of operation in which parent or precursor ions are alternatively fragmented or reacted so as to produce fragment or product ions, and not fragmented or reacted or fragmented or reacted to a lesser degree; a Multiple Reaction Monitoring ("MRM") mode of operation; a Data Dependent Analysis ("DDA") mode of operation; a Data Independent Analysis ("DIA") mode of operation a Quantification mode of operation or an Ion Mobility Spectrometry ("IMS") mode of operation.

BRIEF DESCRIPTION OF THE DRAWINGS

Various embodiments will now be described, by way of example only, and with reference to the accompanying drawings in which.

DETAILED DESCRIPTION

Figure 1:
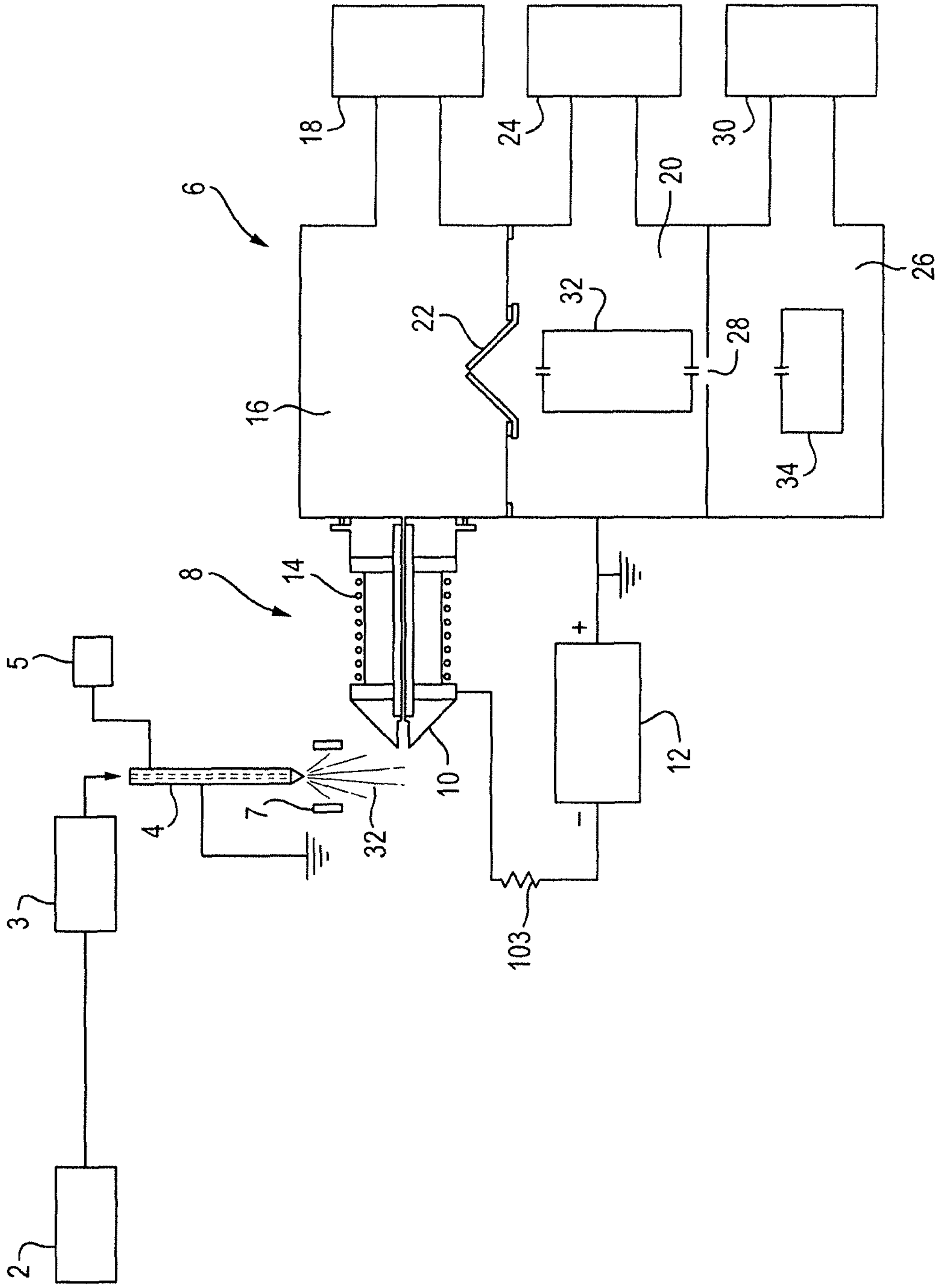
FIG. 1 shows a schematic of an embodiment according to the present invention.

FIG. 1 illustrates an embodiment of the invention. The instrument comprises a source of a sample to be analyzed 2, a liquid chromatography separator 3, a nebulizer 4 such as a pneumatically assisted nebulizer, a mass spectrometer 6 and an interface 8 for interfacing the nebulizer 4 with the mass spectrometer 6. As shown in FIG. 1, the nebulizer 4 may be grounded at a reference potential. A translator mechanism may be provided for translating the nebulizer between different spraying locations or spraying angles. A spray guide 7 may be provided for altering the pathway along which spray 32 from the nebulizer 4 travels.

The interface 8 comprises an interface cone 10 that is connected to a power supply 12 for supplying a voltage to the interface cone 10. The interface 8 also comprises an ion guide 14 for guiding ions from the interface cone 10 into the spectrometer 6.

The spectrometer 6 comprises a first vacuum chamber 16 that is maintained at a first pressure by vacuum pump 18. For example, the vacuum pump 18 may be operated to maintain the first vacuum chamber 16 at a pressure below 50 Torr, e.g., in the range of 1-10 Torr or 1-3 Torr. The spectrometer 6 comprises a second vacuum chamber 20 that is connected to the first vacuum chamber 16 by an orifice, e.g., such as a skimmer cone 22. The second vacuum chamber 20 is maintained at a second pressure by vacuum pump 24 that is lower than the first pressure in the first vacuum chamber 16. For example, the vacuum pump 24 may be operated to maintain the second vacuum chamber 20 at a pressure of $10^{-2}$ to $10^{-3}$ Torr.

The spectrometer 6 comprises a third vacuum chamber 26 that is connected to the second vacuum chamber 20 by an orifice 28. The third vacuum chamber 26 is maintained at a third pressure by vacuum pump 30 that is lower than the second pressure in the second vacuum chamber 20. For example, the vacuum pump 30 may be operated to maintain the third vacuum chamber 26 at a pressure of $\leq 10^{-5}$ Torr. An ion guide 32 may be provided in the second vacuum chamber 20 for guiding ions from the first vacuum chamber 16, through the second vacuum chamber 20, and into the third vacuum chamber 26. An analyzer 34, such as a mass and/or ion mobility is provided in the third vacuum chamber 26 for analyzing the ions. The analyzer 34 may be a Time of Flight mass analyzer, a quadrupole mass analyzer, an ion trap mass analyzer, or another type of mass analyzer.

In operation, sample is supplied from source 2 to liquid chromatography separator 3, which separates the components/compounds in the sample and then supplies the separated components/compounds to a bore in the nebulizer 4, which may be grounded. A gas flow may be arranged to flow passed the tip of the nebulizer 4 so as to nebulize the sample to form droplets 32, i.e. the nebulizer 4 may be a pneumatically-assisted nebulizer 4.

The instrument may be operated in at least two different modes. In a first mode, the nebulizer 4 is held at electrical ground and power supply 12 applies a negative voltage to interface cone 10. For example, in the range of −2 kV to −5 kV. The stress imposed by the electric field produced by the difference in electrical potential between the output of nebulizer 4 and interface cone 10 may cause the liquid flowing out of nebulizer 4 to break into an electrospray of (highly) positively charged droplets, clusters and ions. The electric field between nebulizer 4 and interface cone 10 therefore converts the liquid sample entering nebulizer 4 into a positively charged spray 32, including positively charged analyte ions from analyte molecules in the liquid stream.

The first vacuum chamber 16 may be maintained at a pressure lower than the pressure of the region in which the spray 32 is emitted by the nebulizer 4. As such, a gas flows from the region in which the spray 32 is emitted by the nebulizer into the orifice in the interface cone 10 and then into the first vacuum chamber 16. This flow of gas carries the electrosprayed droplets, clusters and ions such that at least some of the droplets, clusters and ions pass through the orifice in interface cone 10 and into first vacuum chamber 16.

After the ions enter the first vacuum chamber 16 they are directed by electric fields and gas flow within the spectrometer 6 to pass through the skimmer 22 into the second vacuum chamber 20. The ion guide 32 in the second vacuum chamber then guides the ions into the third vacuum chamber 26 such that the ions enter the analyzer 34 and are mass and/or ion mobility analyzed.

In a second mode of operation, the nebulizer 4 is held at electrical ground and power supply 12 applies a positive voltage to interface cone 10. Analyte molecules in the portion of the spray 32 that directly impacts the interface cone 10 are converted into positive ions by impact ionization. As described in relation to the first mode of operation, the gas flow into the interface cone 10 conveys the ions into the first vacuum chamber 16 and ultimately the ions are guided to the analyzer 35 for analysis.

The power supply is configured to repeatedly alternate the voltage applied to the interface cone 10 between the positive and negative values such that the instrument repeatedly alternates between the first and second modes during a single experimental run. The instrument is therefore able to ionize analyte molecules by both electrospray and impact spray during a single experimental run. For example, the sample may be separated by chromatography prior to being nebulized in the nebulizer 4, and the voltage applied to the interface cone 10 may be repeatedly alternated between the positive and negative values at a rate such that ions in each chromatographic peak are subjected to both electrospray and impact ionization. For example, the voltage applied to the interface cone 10 may be repeatedly alternated between the positive and negative values at a rate in the range of 100 Hz to 1 KHz.

The optimal position of the nebulizer 4 relative to the interface cone 10 for electrospray ionization may be different to optimal position of the nebulizer 4 relative to the interface cone 10 for impact ionisation. The instrument may therefore include a translator mechanism 5 that moves the nebulizer 4 to a first position when the instrument is operated in the first mode and a second position when the instrument is operated in the second mode. The nebulizer 4 may therefore repeatedly oscillate between first and second positions in synchronism with the instrument repeatedly alternating between operating in the first and second modes. For example, the nebulizer 4 may oscillate back and forth along an arc between the first and second positions.

Alternately, rather than moving the nebulizer 4 itself between different positions in the first and second modes of operation, the path of the spray 32 may be diverted in one or both of the first and second modes such that the path of the spray 32 is different in the first and second modes. This may be achieved by using a spray guide 7 to guide the droplets along different pathways in the different modes. For example, the spray guide 7 may comprise a tube moves between different positions in the two modes for guiding the spray along different pathways in the different modes. Alternatively, the spray guide 7 may be a gas curtain or gas flow that is directed in different directions or has different flow rates in the two modes, for guiding the spray along different pathways in the different modes.

Figure 2A:
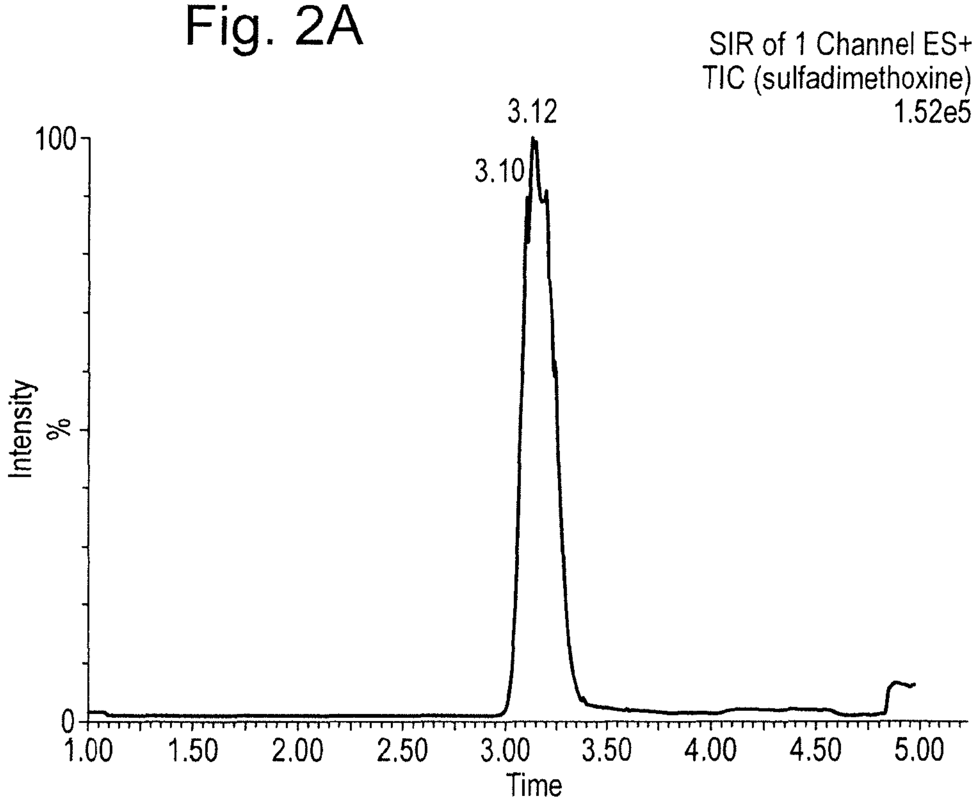
FIG. 2A show an ion spectrum obtained according to an embodiment in an impact spray mode.
Figure 2B:
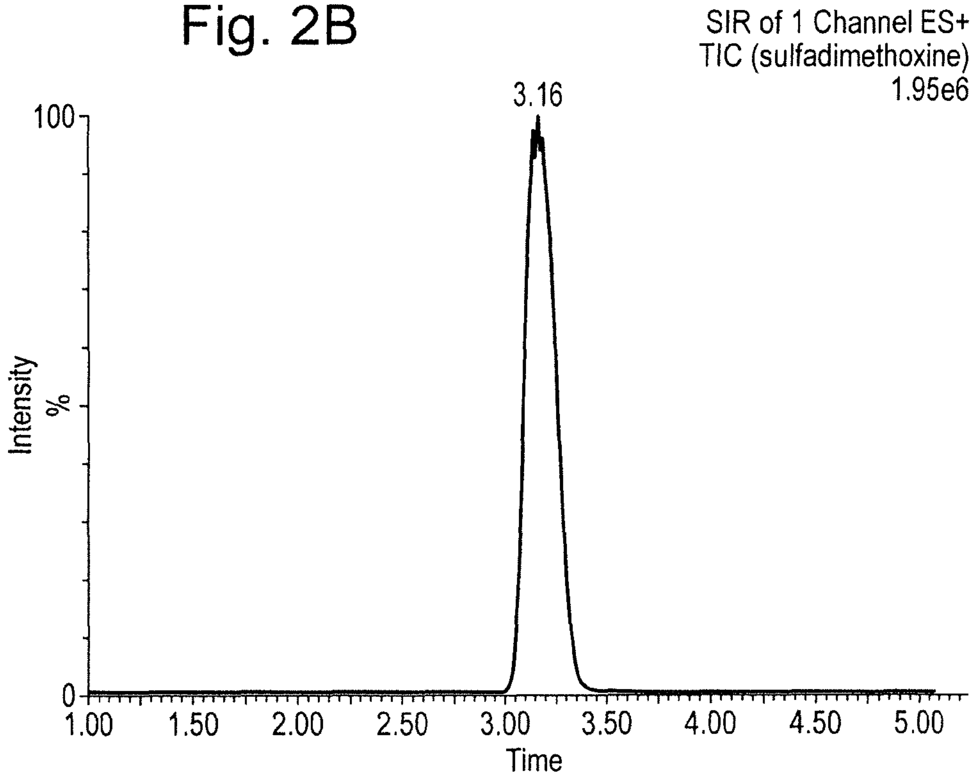
FIG. 2B show an ion spectrum obtained according to an embodiment in an electrospray mode.

FIG. 2A and FIG. 2B show total ion currents measured as a function of time for the analysis of sulfadimethoxine in the impact spray mode and the grounded electrospray mode, respectively. In both modes, the sample of sulfadimethoxine was nebulized in the nebulizer 4 using a nebulizing gas of pure nitrogen. During the impact spray mode the interface cone 10 was maintained at +1280 V and generated positive ions from the sulfadimethoxine impacting on the interface cone 10. During the electrospray mode the electrospray mode the interface cone 10 was maintained at a negative voltage and generated positive electrospray ions from the sulfadimethoxine. It can be seen by comparing FIGS. 2A and 2B that both ionization modes produce analyte ions for analysis, but that the analyte is ionized more effectively by electrospray ionisation since the total ion current is higher in FIG. 2B. In contrast, other analytes in a sample may be more effectively ionized by the impact spray mode. As such, alternating between the two modes enables a greater range of analytes to be ionised effectively in a single experimental run.

Although the present invention has been described with reference to preferred embodiments, it will be understood by those skilled in the art that various changes in form and detail may be made without departing from the scope of the invention as set forth in the accompanying claims.

For example, in FIG. 1 the axis through the exit orifice of the nebulizer 4 is oriented orthogonally to the axis through the orifice in the interface cone 10. However, it is contemplated that the axis through the exit orifice of the nebulizer 4 may be oriented at other angles with respect to the axis through the orifice in the interface cone 10.

The invention claimed is:

1. A mass and/or mobility spectrometer comprising:

a spray device having a bore through which liquid sample is prayed, in use, into a spray region;

a vacuum region configured to be maintained at a lower pressure than the spray region;

an impact surface arranged as an interface between the spray region and the vacuum region, wherein the impact surface is an inlet cone comprising an aperture;

a power supply configured to:

(i) maintain the spray device at a reference electrical potential;

(ii) maintain the impact surface at a voltage of a first polarity relative to the reference potential, during a first ionization mode, so as to generate an electrical potential difference in the spray regain and produce analyte ions by electrospray ionization;

(iii) maintain the impact surface at a voltage of a second polarity relative to the reference potential, during a second ionization mode, so that the sample is sprayed onto the impact surface to produce analyte ions by impact ionization, wherein the second polarity is opposite the first polarity relative to the reference potential; and (iv) alternate the polarity of the voltage at which the impact surface is maintained so as to switch between the first and second ionization modes;

wherein the mass and/or mobility spectrometer is configured to urge ions generated in the first and second ionization modes through the aperture in the impact surface and into the vacuum region; and further comprising a mass and/or ion mobility analyser for mass and/or ion mobility analysing ions produced by the first and second ionization modes.

2. The mass and/or mobility spectrometer of claim 1, comprising a sample separator upstream of the sprayer and in fluid communication with the sprayer for separating components within the sample such that the sprayer receives and sprays different components of the sample at different times.

3. The mass and/or mobility spectrometer of claim 1, wherein the reference potential is a ground potential.

4. The mass and/or mobility spectrometer of claim 1, comprising a spray guide arranged and configured to: (i) direct the spray from the sprayer to pass along a first pathway in the first ionization mode, and to deflect the spray from the sprayer to pass along a second, different pathway in the second ionization mode so as to impact on the impact surface; and/or (ii) deflect the spray from the sprayer to pass along a first pathway in the first ionization mode so as to deflect the spray away from the impact surface, and to deflect the spray from the sprayer to pass along a second, different pathway in the second ionization mode.

5. The mass and/or mobility spectrometer of claim 1, wherein the sprayer comprises: an inner bore through which the liquid sample is sprayed, in the first and/or second ionization modes; a desolvation gas capillary surrounding the inner bore through which a desolvation gas is passed, in the first and/or second ionization modes, for desolvating the sample sprayed by the sprayer; and an electrical heater which, in the first and/or second ionization modes, heats the desolvation gas; wherein the voltage supply is arranged and configured to maintain the bore at ground electrical potential during said first and/or second ionization modes.

6. The mass and/or mobility spectrometer of claim 1, wherein the power supply is arranged and configured to repeatedly alternate the ion source between the first ionisation mode and the second ionisation mode such that each of the first ionisation mode and the second ionisation mode is performed multiple times during a single experimental run.

7. A method of mass and/or ion mobility spectrometry comprising;

providing the mass and/or mobility spectrometer of claim 1;

performing the first ionization mode in which the sample is electrosprayed so as to produce ions by electrospray ionization;

performing the second ionization mode in which the sample is ionized by impact ionization; and alternating between the first and second ionization modes during a single experimental run.

8. The method of claim 7, comprising spatially separating different components within the sample upstream of the sprayer, and supplying the separated components to the sprayer such that the sprayer sprays different components of the sample at different times; optionally wherein the components are separated by a liquid chromatography separator.

9. The method of claim 8, wherein the method is alternated between the first and second ionization modes at a rate such that at least one of the components in the sample, or each component in the sample, is ionized in both the first and second ionization modes as it elutes from the separator and sprayer.

10. The method of claim 7, comprising alternating the sprayer between a first spraying angle or location in the first mode of operation and a second, different spraying angle or location in the second mode of operation.

11. The method of claim 7, comprising arranging the spray from the sprayer to pass along a first pathway in the first ionization mode, and the spray from the sprayer to pass along a second, different pathway in the second ionization mode; optionally by deflecting the spray so as to pass along the first pathway in the first ionization mode and/or deflecting the spray so as to pass along the second pathway in the second ionization mode.

* * * * *